United States Patent
Miyazaki

(10) Patent No.: US 11,513,462 B2
(45) Date of Patent: Nov. 29, 2022

(54) IMAGE FORMING APPARATUS WITH NOTIFICATION FOR REPLACEMENT OF A TONER CARTRIDGE

(71) Applicant: Konica Minolta, Inc., Tokyo (JP)

(72) Inventor: Ken Miyazaki, Sagamihara (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/391,380

(22) Filed: Aug. 2, 2021

(65) Prior Publication Data

US 2022/0035294 A1 Feb. 3, 2022

(30) Foreign Application Priority Data

Aug. 3, 2020 (JP) .............................. JP2020-131696

(51) Int. Cl.
*G03G 15/00* (2006.01)
*G06F 3/12* (2006.01)

(52) U.S. Cl.
CPC ....... *G03G 15/556* (2013.01); *G03G 15/5016* (2013.01); *G06F 3/1235* (2013.01)

(58) Field of Classification Search
CPC ........... G03G 15/0886; G03G 15/5016; G03G 15/556; G03G 15/6517; G03G 15/652; G03G 2215/00455; B41J 15/00; B41J 29/46; B41J 2/17566; B41J 2002/17569; B41M 5/0041; B41M 1/26; B41P 2217/52; B41P 2233/30; B41F 33/0045; G06F 3/1219; G06F 3/1235; G06F 3/1251; G06K 15/022; G06K 15/4075

USPC ........................................ 399/27, 43, 81, 384
See application file for complete search history.

(56) References Cited

U.S. PATENT DOCUMENTS

| | | | | |
|---|---|---|---|---|
| 2015/0302284 | A1* | 10/2015 | Ido | G03G 15/556 358/1.9 |
| 2016/0062293 | A1* | 3/2016 | Nakamura | G03G 15/553 399/27 |
| 2018/0095398 | A1* | 4/2018 | Yoshida | G03G 15/5016 |
| 2018/0307172 | A1* | 10/2018 | Ohshika | G03G 15/652 |
| 2019/0041786 | A1* | 2/2019 | Shinagawa | G03G 21/1889 |
| 2019/0235434 | A1* | 8/2019 | Kawaguchi | G03G 15/556 |
| 2020/0041944 | A1* | 2/2020 | Hiraike | G03G 15/556 |
| 2020/0055318 | A1* | 2/2020 | Matsuda | B41J 29/38 |
| 2020/0364004 | A1* | 11/2020 | Omura | G06F 3/1235 |

FOREIGN PATENT DOCUMENTS

JP 61-185762 8/1986

* cited by examiner

*Primary Examiner* — Robert B Beatty
(74) *Attorney, Agent, or Firm* — BakerHostetler

(57) ABSTRACT

An image forming apparatus includes: a hardware processor that: estimates a remaining amount of toner in a cartridge; registers a required replacement time corresponding to a time required by an operator to replace the cartridge; calculates a toner consumption speed when an image is printed, on the basis of data of the image to be printed and a printing speed when the image is printed; predicts a first timing at which the cartridge reaches a toner runout state during printing of the image, on the basis of the remaining amount of toner and the toner consumption speed; and makes notification for prompting the operator to replace the cartridge at a second timing before the first timing by the required replacement time.

6 Claims, 9 Drawing Sheets

FIG. 6

| COVERAGE | AMOUNT OF TONER CONSUMPTION: Y COMPONENT | AMOUNT OF TONER CONSUMPTION: M COMPONENT | AMOUNT OF TONER CONSUMPTION: C COMPONENT | AMOUNT OF TONER CONSUMPTION: K COMPONENT |
|---|---|---|---|---|
| 80% | ... | ... | ... | ... |
| 50% | ... | ... | ... | ... |
| 30% | ... | ... | ... | ... |
| 15% | ... | ... | ... | ... |
| 3.5% | ... | ... | ... | ... |

IMAGE FORMING APPARATUS WITH NOTIFICATION FOR REPLACEMENT OF A TONER CARTRIDGE

The entire disclosure of Japanese patent Application No. 2020-131696, filed on Aug. 3, 2020, is incorporated herein by reference in its entirety.

BACKGROUND

Technological Field

The present disclosure relates to an image forming apparatus and a method for controlling the image forming apparatus.

Description of the Related Art

An image forming apparatus (printer, copier, facsimile, and the like) using an electrophotographic process technology is known.

In general, in this type of image forming apparatus, toner is supplied from a developing device to a photoreceptor on which an electrostatic latent image is formed to form a toner image corresponding to the electrostatic latent image on a surface of the photoreceptor, the toner image formed on the surface of the photoreceptor in this way is transferred to a recording medium, or the toner image formed on the surface of the photoreceptor is transferred to an intermediate transfer member such as an intermediate transfer belt, and then the toner image transferred to the intermediate transfer member is transferred to the recording medium to form an image on the recording medium. Then, in a case where an amount of toner in the developing device decreases as a result of supplying the toner from the developing device to the photoreceptor, the toner is replenished from a cartridge attached to the image forming apparatus into the developing device.

In recent years, research and development have been advanced of an image forming system in which such an image forming apparatus is applied to printing on a long sheet (for example, roll sheet or continuous sheet) used for label creation. This type of image forming system includes, for example, a sheet feeding apparatus, an image forming apparatus, and a winding apparatus, and has a mechanism in which an image is formed on a long sheet continuously supplied from the sheet feeding apparatus by the image forming apparatus, and the long sheet on which the image is formed is sequentially wound and collected by the winding apparatus (see FIG. 2 described later).

In this type of image forming system, from the viewpoint of production efficiency, it is required to continue printing operation continuously from the beginning to the end of the long sheet without printing stop performed in the middle. This is because if printing stop is to be performed in the middle, a blank area is generated in the long sheet due to the characteristics of the electrophotographic process technology. This is due to the fact that, when printing is stopped in a state where non-fixed toner remains on a photosensitive drum or the like, the non-fixed toner scatters in the apparatus, which causes subsequent image quality degradation and contamination, and thus the drive roller and the like has to be driven more than necessary from a desired printing stop position.

For that reason, at a work site where this type of image forming system is actually used, a remaining amount of toner in the cartridge serving as a toner supply source of the image forming apparatus is monitored by an operator, and replacement of the cartridge is also performed by the operator while the printing operation is being executed so that printing stop due to toner runout does not occur in the middle.

FIG. 1 is a diagram illustrating an example of a blank area generated in a long sheet. FIG. 1 illustrates a blank area generated in a long sheet P when the printing operation is stopped and then the printing operation is resumed while an image of a label is formed on the long sheet P.

The long sheet in which the blank area is generated is generally regarded as a defective product (for example, in a case where a printing target is a label as illustrated in FIG. 1, a displacement of a label forming position occurs in the middle, a positional displacement of the label occurs when the label is pasted to a PET bottle or the like by a labeler machine). For that reason, in a case where a blank area is generated in the long sheet, cutting and joining by manual work are necessary to remove the blank area from the long sheet at the work site, which leads to a decrease in production efficiency and an increase in work load on the operator.

On the other hand, it is not preferable to replace the cartridge at an unnecessarily early timing from the viewpoint of an increase in cost due to discarding a large amount of toner in the cartridge, an influence on environmental pollution, and the like.

From such a background, at a work site where this type of image forming system is actually used, the operator is required to predict accurately to some extent the time until the cartridge of the image forming apparatus reaches a toner runout state. However, since the time until the cartridge reaches the toner runout state changes depending on the coverage, print speed, and the like of the image to be printed, even an experienced operator is in a situation where it is difficult to accurately estimate the time. In addition, the operator normally also performs pre-press work, post-process work (for example, slit processing for dividing one roll, decoration processing such as foil stamping or varnishing, die cutting processing for making cuts, and punching processing that removes unnecessary portion), and the like in addition to cartridge replacement work, and does not pay attention only to the remaining amount of toner at the present time, and thus there is a possibility that the operator does not notice the necessity of cartridge replacement until immediately before the toner runout state and misses cartridge replacement time.

Note that, a technology has conventionally been variously studied that estimate an amount of toner consumption consumed from time to time in consideration of the output of a laser beam with which the photosensitive drum is irradiated, to accurately estimate the remaining amount of toner in the cartridge (see, for example, JP 61-185762 A). However, in this type of conventional technology, it is possible to accurately estimate the remaining amount of toner in the cartridge, but it is not possible to prevent the operator from missing the cartridge replacement time.

SUMMARY

The present disclosure has been made in view of the above problems, and an object of the present disclosure is to provide an image forming apparatus and a method for controlling the image forming apparatus capable of preventing an operator from missing cartridge replacement time.

To achieve the abovementioned object, according to an aspect of the present invention, an image forming apparatus reflecting one aspect of the present invention comprises: a hardware processor that: estimates a remaining amount of toner in a cartridge; registers a required replacement time corresponding to a time required by an operator to replace the cartridge; calculates a toner consumption speed when an image is printed, on the basis of data of the image to be printed and a printing speed when the image is printed; predicts a first timing at which the cartridge reaches a toner runout state during printing of the image, on the basis of the remaining amount of toner and the toner consumption speed; and makes notification for prompting the operator to replace the cartridge at a second timing before the first timing by the required replacement time.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a diagram illustrating an example of table data referred to by a toner consumption speed calculator according to the first embodiment to calculate a toner consumption speed;

DETAILED DESCRIPTION OF EMBODIMENTS

Figure 1:
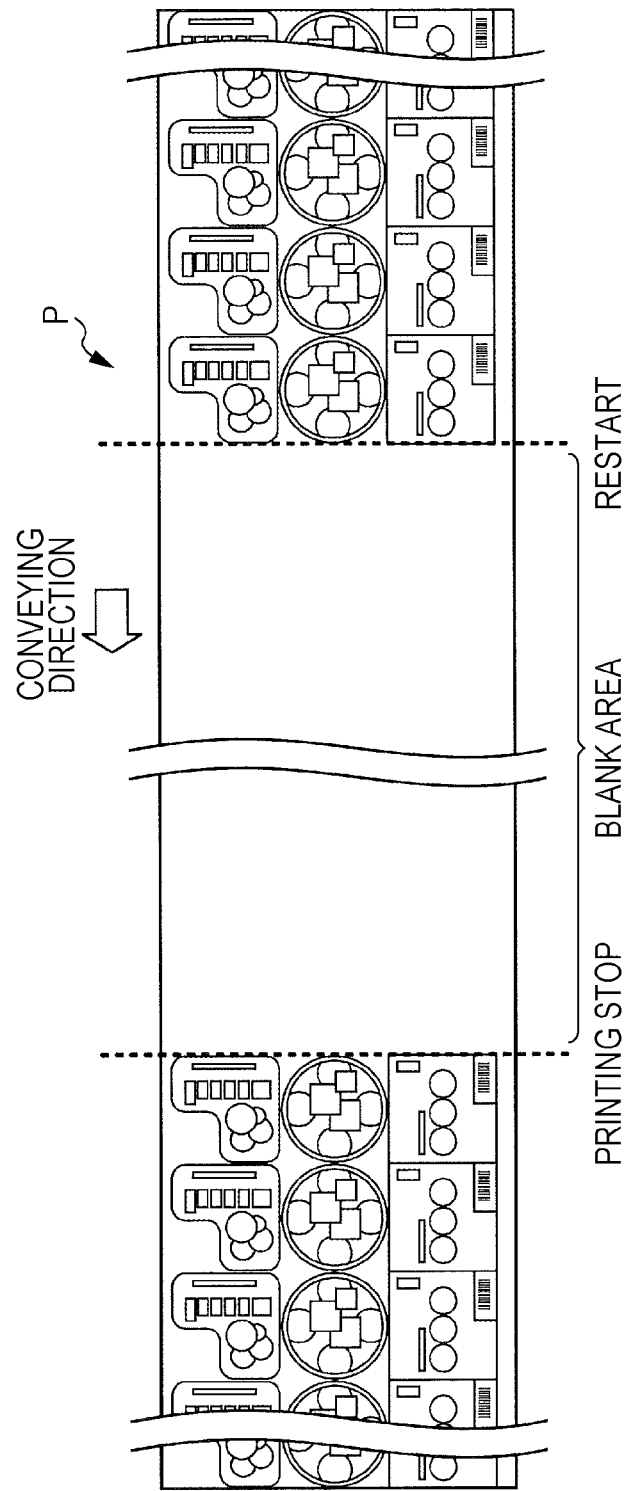
FIG. 1 is a diagram illustrating an example of a blank area generated in a long sheet.

Hereinafter, one or more embodiments of the present invention will be described with reference to the drawings. However, the scope of the invention is not limited to the disclosed embodiments. Note that, in the present specification and the drawings, components having substantially the same function will be denoted by the same reference numerals, and redundant descriptions will be omitted.

(First Embodiment)

Hereinafter, an example of a configuration of an image forming system according to a first embodiment will be described with reference to FIGS. 2 to 9.

Figure 2:
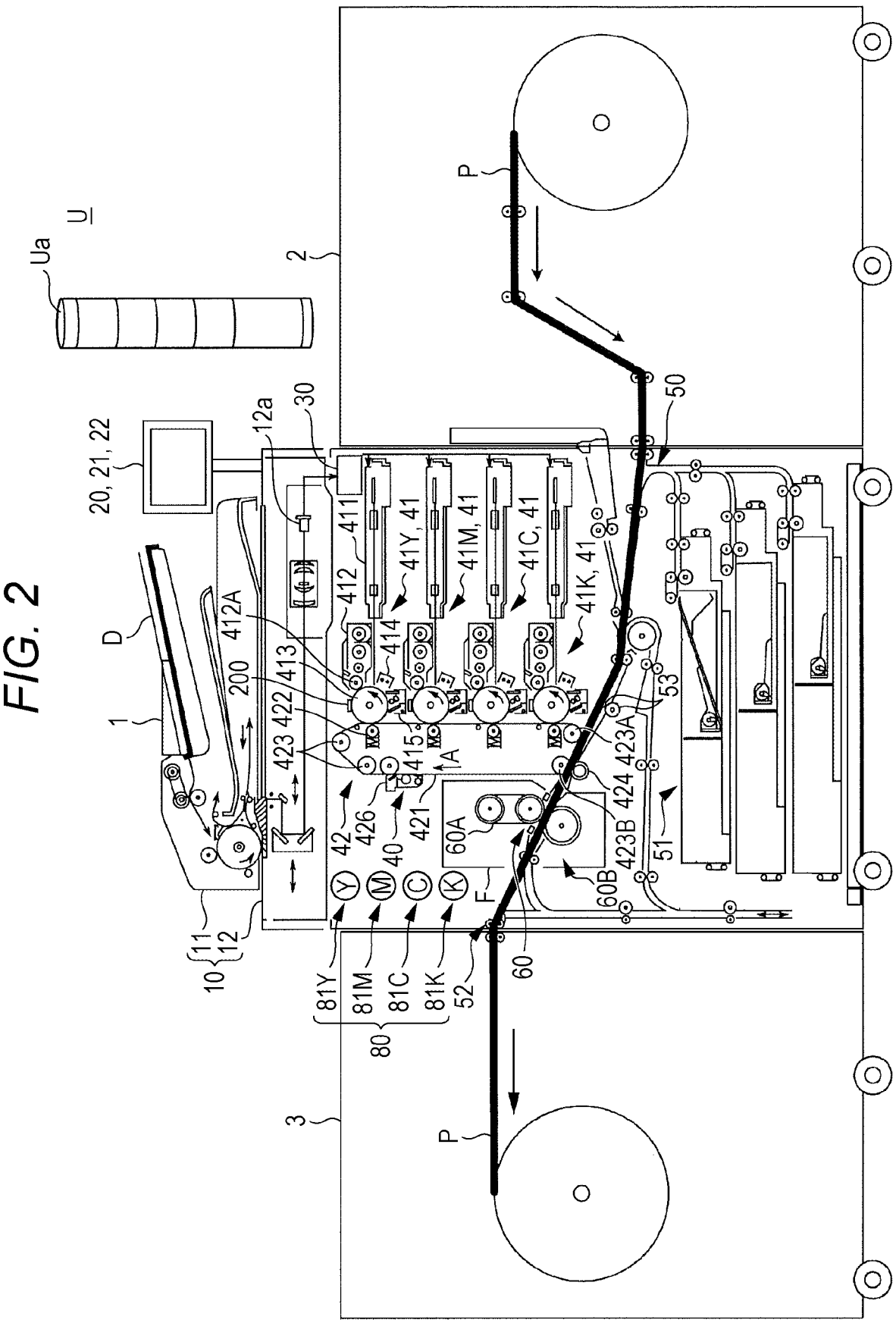
FIG. 2 is a diagram schematically illustrating an overall configuration of an image forming system according to a first embodiment.
Figure 3:
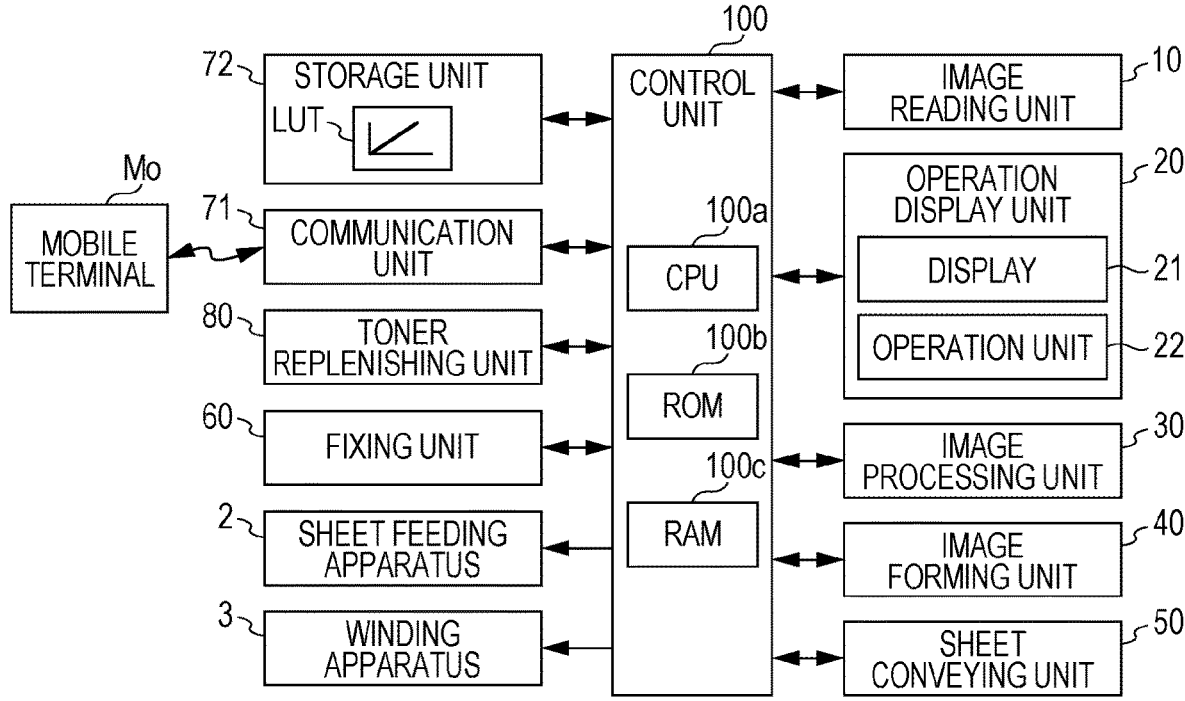
FIG. 3 is a diagram illustrating a main part of a control system of an image forming apparatus included in the image forming system according to the first embodiment.

FIG. 2 is a diagram schematically illustrating an overall configuration of an image forming system U according to the present embodiment. FIG. 3 is a diagram illustrating a main part of a control system of an image forming apparatus 1 included in the image forming system U according to the present embodiment.

The image forming system U is a system that uses a long sheet P as a recording medium and forms an image on the long sheet P. The long sheet P is a recording medium having, for example, a length exceeding a main body width of the image forming apparatus 1 in a conveying direction, and includes a roll sheet or a continuous sheet.

As illustrated in FIG. 2, in the image forming system U, from an upstream side along the conveying direction of the long sheet P a sheet feeding apparatus 2, the image forming apparatus 1, and a winding apparatus 3 are connected together. The sheet feeding apparatus 2 and the winding apparatus 3 are used in a case where an image is formed on the long sheet P.

The sheet feeding apparatus 2 is an apparatus that feeds the long sheet P to the image forming apparatus 1. In a housing of the sheet feeding apparatus 2, the long sheet P is wound around a support shaft in a roll shape and rotatably held. The sheet feeding apparatus 2 conveys the long sheet P wound around the support shaft to the image forming apparatus 1 at a constant speed via a plurality of conveying roller pairs such as a feeding roller and a sheet feeding roller. Sheet feeding operation of the sheet feeding apparatus 2 is controlled by a control unit 100 included in the image forming apparatus 1.

The image forming apparatus 1 is a color image forming apparatus 1 of an intermediate transfer method using an electrophotographic process technology. That is, the image forming apparatus 1 forms an image by performing primary transfer of each toner color toner image of yellow (Y), magenta (M), cyan (C), and black (K) formed on a photoreceptor drum 413 to an intermediate transfer belt 421, and laying over the toner images of four colors on the intermediate transfer belt 421, and then performing secondary transfer to the long sheet P fed from the sheet feeding apparatus 2.

Furthermore, in the image forming apparatus 1, a tandem system is adopted in which photoreceptor drums 413 respectively corresponding to four colors of Y, M, C, and K are serially arranged in a traveling direction of the intermediate transfer belt 421, and each toner color toner image is sequentially transferred to the intermediate transfer belt 421 in a single procedure.

As illustrated in FIG. 3, the image forming apparatus 1 includes an image reading unit 10, an operation display unit 20, an image processing unit 30, an image forming unit 40, a sheet conveying unit 50, a fixing unit 60, a communication unit 71, a storage unit 72, a toner replenishing unit 80, and a control unit 100.

The control unit 100 includes a central processing unit (CPU) 100a, read only memory (ROM 100b, random access memory (RAM) 100c, and the like. The CPU 100a reads a program depending on processing details from the ROM 100b and deploys the program on the RAM 100c, and centrally controls operation of each block and the like of the image forming apparatus 1 cooperating with the program deployed. At this time, various types of data stored in a storage unit 72 are referenced. The storage unit 72 includes, for example, a nonvolatile semiconductor memory (so-called flash memory) or a hard disk drive.

The control unit 100 performs transmission and reception of various types of data with an external device (for example, a personal computer (not illustrated), and a mobile terminal Mo) connected to a communication network such as a local area network (LAN), or a wide area network (WAN), via a communication unit 71. The control unit 100 receives image data (input image data) transmitted from the external device, for example, and forms an image on the long sheet P on the basis of the image data. The communication unit 71 includes, for example, a communication control card such as a LAN card.

As illustrated in FIG. 2, the image reading unit 10 includes an automatic document sheet feeding device 11 that is referred to as an auto document feeder (ADF), and a document image scanning device 12 (scanner).

The automatic document sheet feeding device 11 conveys a document D placed on a document tray with a conveying mechanism, and sends the document to the document image scanning device 12. With the automatic document sheet feeding device 11, it is possible to read continuously at once the image (including both sides) of a large number of sheets of the document D placed on the document tray.

The document image scanning device 12 optically scans the document conveyed onto a contact glass from the automatic document sheet feeding device 11 or the document placed on the contact glass, and focuses reflected light from the document on a light receiving surface of a charge coupled device (CCD) sensor 12*a*, and reads a document image. The image reading unit 10 generates input image data on the basis of a reading result by the document image scanning device 12. On the input image data, predetermined image processing is performed in the image processing unit 30.

As illustrated in FIG. 2, the operation display unit 20 (hereinafter, also referred to as an "operation panel 20") includes, for example, a liquid crystal display (LCD) with a touch panel, and functions as a display 21 and an operation unit 22. The display 21 displays various types of operation screens, a state of the image, operating conditions of the functions, information regarding printing, and the like, in accordance with a display control signal input from the control unit 100. The operation unit 22 includes various types of operation keys such as a numeric keypad, and a start key, and receives various types of input operations by a user, and outputs an operation signal to the control unit 100.

The image processing unit 30 includes a circuit or the like that performs digital image processing depending on an initial setting or a user setting, on the input image data. For example, the image processing unit 30 performs tone correction on the basis of tone correction data (tone correction table) under control of the control unit 100. Furthermore, besides the tone correction, the image processing unit 30 performs on the input image data various types of correction processing such as color correction, and shading correction, and compression processing.

The image forming unit 40 is controlled on the basis of the image data to which these types of processing is performed.

As illustrated in FIG. 2, the image forming unit 40 includes an intermediate transfer unit 42, and image formation units 41Y, 41M, 41C, and 41K for forming images formed by color toners of Y, M, C, and K components respectively on the basis of the input image data.

The image formation units 41Y, 41M, 41C, and 41K for the respective Y, M, C, and K components have similar configurations. For convenience of illustration and description, common components are denoted by the same reference numerals, and in a case where the components are distinguished from each other, the components are denoted by adding Y, M, C, or K to the reference numerals. In FIG. 2, the reference numeral is given to only the component of the image formation unit 41Y for the Y component, and the reference numerals for the components of other image formation units 41M, 41C, and 41K are omitted.

The image formation unit 41 includes an exposure device 411, a developing device 412, a photoreceptor drum 413, a charging device 414, a drum cleaning device 415, and a toner collection unit 200.

The photoreceptor drum 413 includes, for example, an organic photoreceptor in which a photosensitive layer including a resin containing an organic photoconductor is formed on an outer circumferential surface of a drum-shaped metallic base.

The control unit 100 rotates the photoreceptor drum 413 at a constant circumferential speed by controlling a drive current to be supplied to a drive motor (not illustrated) that rotates the photoreceptor drum 413.

The charging device 414 is, for example, a charger, and generates corona discharge to uniformly charge a surface of the photoreceptor drum 413 having photoconductivity to negative polarity.

The exposure device 411 includes a semiconductor laser, for example, and emits a laser beam corresponding to an image of each toner color component to the photoreceptor drum 413. As a result, an electrostatic latent image of each toner color component is formed in an image area irradiated with the laser beam in the surface of the photoreceptor drum 413 due to a potential difference from a background area.

The developing device 412 is a developing device of a two-component reversal method, and develops the electrostatic latent image as a toner image by visualizing the electrostatic latent image by allowing a developer of each toner color component to adhere to the surface of the photoreceptor drum 413.

A developing roller 412A of the developing device 412 carries the developer while rotating, and supplies toner contained in the developer to the photoreceptor drum 413. Specifically, a developing bias is applied from a developing bias application unit (not illustrated) to the developing roller 412A, and a potential difference is generated between the developing roller 412A and the surface of the photoreceptor drum 413, whereby the toner image is formed on the surface of the photoreceptor drum 413.

The drum cleaning device 415 includes a flat plate-shaped drum cleaning blade that is brought into contact with the surface of the photoreceptor drum 413 and has elasticity, and the like, and removes toner remaining on the surface of the photoreceptor drum 413 without being transferred to the intermediate transfer belt 421.

The intermediate transfer unit 42 includes the intermediate transfer belt 421, a primary transfer roller 422, a plurality of support rollers 423, a secondary transfer roller 424, and a belt cleaning device 426.

The intermediate transfer belt 421 includes an endless belt, and is stretched by the plurality of support rollers 423 in a loop shape. At least one of the plurality of support rollers 423 includes a drive roller, and the other includes a driven roller. For example, a roller 423A is preferably the drive roller, which is arranged at a belt traveling direction downstream side from the primary transfer roller 422 for the K component. As a result, it is easy to hold a traveling speed constant of the belt in a primary transfer unit. The drive roller 423A rotates, whereby the intermediate transfer belt 421 travels at a constant speed in an arrow A direction.

The intermediate transfer belt 421 is a belt having conductivity and elasticity, and has a high resistance layer on a front surface thereof. The intermediate transfer belt 421 is rotationally driven by a control signal from the control unit 100.

The primary transfer roller 422 is arranged at an inner circumferential surface side of the intermediate transfer belt 421 facing the photoreceptor drum 413 of each toner color component. The primary transfer roller 422 is pressed against the photoreceptor drum 413 sandwiching the intermediate transfer belt 421, whereby a primary transfer nip is formed for transferring the toner image from the photoreceptor drum 413 to the intermediate transfer belt 421.

The secondary transfer roller 424 is arranged at an outer circumferential surface side of the intermediate transfer belt 421 facing a backup roller 423B arranged at the belt traveling direction downstream side of the drive roller 423A. The secondary transfer roller 424 is pressed against the backup roller 423B sandwiching the intermediate transfer belt 421, whereby a secondary transfer nip is formed for transferring the toner image from the intermediate transfer belt 421 to the long sheet P.

When the intermediate transfer belt 421 passes through the primary transfer nip, the toner image on the photoreceptor drum 413 is subjected to primary transfer of sequentially to be overlaid onto the intermediate transfer belt 421. Specifically, a primary transfer bias is applied to the primary transfer roller 422, and electric charge having an opposite polarity to the toner is given to the back surface side of the intermediate transfer belt 421, that is, a contact side with the primary transfer roller 422, whereby the toner image is electrostatically transferred to the intermediate transfer belt 421.

After that, when the long sheet P passes through the secondary transfer nip, secondary transfer of the toner image on the intermediate transfer belt 421 is performed onto the long sheet P. Specifically, a secondary transfer bias is applied to the secondary transfer roller 424, and electric charge having an opposite polarity to the toner is given to the back surface side of the long sheet P, that is, a contact side with the secondary transfer roller 424, whereby the toner image is electrostatically transferred to the long sheet P. The long sheet P on which the toner image is transferred is conveyed toward the fixing unit 60.

The belt cleaning device 426 removes transfer residual toner remaining on the front surface of the intermediate transfer belt 421 after the secondary transfer. Note that, instead of the secondary transfer roller 424, a so-called belt type secondary transfer unit may be adopted that has a configuration in which secondary transfer belt is stretched in a loop shape across a plurality of support rollers including the secondary transfer roller.

The toner replenishing unit 80 includes a toner storage unit in which a cartridge 81 is loaded and a conveying unit (not illustrated) that conveys toner in the toner storage unit to the developing device 412, and these units are provided corresponding to each toner color of Y, M, C, and K. The cartridge 81 can be inserted into and removed from the toner storage unit, and it can be detected by a sensor that the cartridge 81 is loaded. The four cartridges 81 are filled with toners of Y, 1\4, C, and K colors, respectively. Note that, the cartridge 81 has, for example, a cylindrical shape, and includes a toner discharge port at one end of the cylindrical shape.

The toner replenishing unit 80 rotates the cylindrical cartridge 81 by a predetermined amount of operation at each predetermined timing, for example. As a result, the toner in the cartridge 81 falls from the toner discharge port formed at one end of the cartridge 81 to the toner storage unit, is temporarily stored in the toner storage unit, and is sequentially guided to the developing device 412.

The fixing unit 60 includes an upper fixing unit 60A including a fixing surface side member arranged on a fixing surface of the long sheet P, that is, a side of a surface on which the toner image is formed, a lower fixing unit 60B having a back surface side support member arranged on a back surface of the long sheet P, that is, a side of a surface opposite to the fixing surface, a heating source, and the like. The back surface side support member is pressed against the fixing surface side member, whereby a fixing nip is formed that sandwiches and conveys the long sheet P.

The fixing unit 60 fixes the toner image to the long sheet P by heating and pressing with the fixing nip the long sheet P on which the secondary transfer of the toner image is performed and that is conveyed. The fixing unit 60 is arranged as a unit in a fixing device F. Furthermore, in the fixing device F, an air separation unit may be arranged that separates the long sheet P from the fixing surface side member or the back surface side support member by an air blow.

The sheet conveying unit 50 includes a sheet feeding unit 51, a sheet ejection unit 52, and a conveying path unit 53. The conveying path unit 53 includes a plurality of conveying roller pairs, and conveys the long sheet P fed from the sheet feeding apparatus 2 to the image forming unit 40 and the fixing unit 60, and then sends the long sheet P to the winding apparatus 3. Note that, the plurality of conveying roller pairs of the conveying path unit 53 includes a registration roller pair that corrects inclination and deviation of the long sheet P.

Note that, the sheet feeding unit 51 is a plain sheet feeding unit provided separately from the sheet feeding apparatus 2, and feeds a sheet having no length exceeding the main body width of the image forming apparatus 1. In three sheet feeding tray units constituting the sheet feeding unit 51, sheets (standard long sheet, special long sheet) identified on the basis of a basis weight or a size are stored for each type set in advance.

The long sheet P (or a sheet fed from the sheet feeding unit 51) is conveyed to the image forming unit 40 by the conveying path unit 53. Then, in the image forming unit 40, secondary transfer of the toner images of the intermediate transfer belt 421 is collectively performed to one surface of the long sheet P, and a fixing process is performed in the fixing unit 60.

Furthermore, the long sheet P fed from the sheet feeding apparatus 2 to the image forming apparatus 1 is conveyed to the image forming unit 40 by the conveying path unit 53. Then, in the image forming unit 40, secondary transfer of the toner images of the intermediate transfer belt 421 is collectively performed to one surface of the long sheet P, and a fixing process is performed in the fixing unit 60. The long sheet P on which an image is formed is conveyed to the winding apparatus 3 by the sheet ejection unit 52 including a conveying roller pair (sheet ejection roller pair).

The winding apparatus 3 is an apparatus that winds the long sheet P conveyed from the image forming apparatus 1. In a housing of the winding apparatus 3, for example, the long sheet P is wound around a support shaft and held in a roll shape. For that reason, the winding apparatus 3 winds the long sheet P conveyed from the image forming apparatus 1 around the support shaft at a constant speed via a plurality of conveying roller pairs (for example, a feeding roller, a sheet ejection roller). Winding operation of the winding apparatus 3 is controlled by the control unit 100 included in the image forming apparatus 1.

Note that, the image forming system U includes a warning lamp Ua for allowing the operator to identify an operating state of the image forming apparatus 1. The warning lamp Ua includes, for example, lamps of four colors of a red lamp, an orange lamp, a green lamp, and a blue lamp, and a lamp to be turned on is selected by the control unit 100. The control unit 100 turns on the red lamp when the image forming apparatus 1 is mechanically stopped due to a sheet jam, no sheet, empty of toner, or the like, for example. The control unit 100 turns on the orange lamp when a toner replenishment message is displayed (in a case where a remaining amount of any one of the four colors of Y, M, C, and K is less than or equal to 25%). The control unit 100 turns on the green lamp while executing printing operation in the image forming apparatus 1. The control unit 100 turns on the blue lamp when the image forming apparatus 1 is on standby in a state where the printing operation is possible. The control unit 100 brings the image forming apparatus 1 into a non-lighting state when the power supply of the image forming apparatus 1 is switched off or during warming up of the image forming apparatus 1.

[Detailed Configuration of Control Unit]

Figure 4:
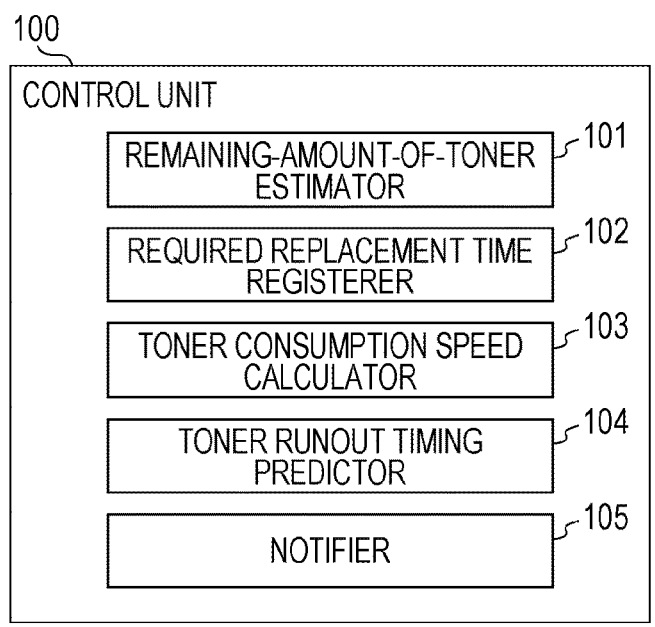
FIG. 4 is a diagram illustrating a functional configuration of a control unit according to the first embodiment.

FIG. 4 is a diagram illustrating a functional configuration of the control unit 100 according to the present embodiment.

The control unit 100 includes a remaining-amount-of-toner estimator 101, a required replacement time registerer 102, a toner consumption speed calculator 103, a toner runout timing predictor 104, and a notifier 105.

The remaining-amount-of-toner estimator 101 estimates a remaining amount of toner in the cartridge 81. The remaining-amount-of-toner estimator 101 estimates an amount of toner consumption in each print job on the basis of, for example, data of an image to be printed (for example, coverage information). Then, the remaining-amount-of-toner estimator 101 estimates a total amount of the amount of toner consumption from a full state by integrating the amount of toner consumption in each print job, thereby estimating the remaining amount of toner in the cartridge 81. The remaining-amount-of-toner estimator 101 typically estimates the remaining amount of toner in the cartridge 81 of each toner color of Y, M, C, and K.

Here, in a case where the image to be printed is a repeated pattern like a label, for example, the remaining-amount-of-toner estimator 101 may estimate the amount of toner consumption consumed when printing an image of one label from data of the image of the label. In this case, the remaining-amount-of-toner estimator 101 may estimate the remaining amount of toner in the cartridge 81 from, for example, the number of labels printed up to the present time.

Note that the method of estimating the remaining amount of toner in the cartridge 81 by the remaining-amount-of-toner estimator 101 is not limited thereto. For example, the remaining-amount-of-toner estimator 101 may estimate the remaining amount of toner in the cartridge 81 using a remaining-amount-of-toner sensor (for example, an optical sensor that detects the remaining amount of toner in the cartridge 81 from an amount of reflected light when a toner reservoir in the cartridge 81 is irradiated with laser light) or the like that directly detects the remaining amount of toner. Furthermore, the remaining-amount-of-toner estimator 101 may estimate the remaining amount of toner in the cartridge 81 on the basis of an amount of operation (for example, the number of rotations) of the cartridge 81.

The required replacement time registerer 102 registers a required replacement time corresponding to a time required by the operator to replace the cartridge 81 (hereinafter, simply referred to as "required replacement time") in the storage unit (for example, the RAM 100c). The "required replacement time" varies individually depending on environment of a workplace where the image forming apparatus 1 is installed, or the like. For that reason, the required replacement time is set to, for example, 10 minutes under an initial condition, and can be individually changed by the operator. Note that, the operator registers the required replacement time in consideration of, for example, a time from when the operator goes from a workplace where the image forming apparatus 1 is installed to a warehouse to pick up a new cartridge 81 for replacement to when the operator returns to the workplace, and a time to when the operator replaces the cartridge 81 currently stored in the image forming apparatus 1 with the new cartridge 81.

Figure 5:
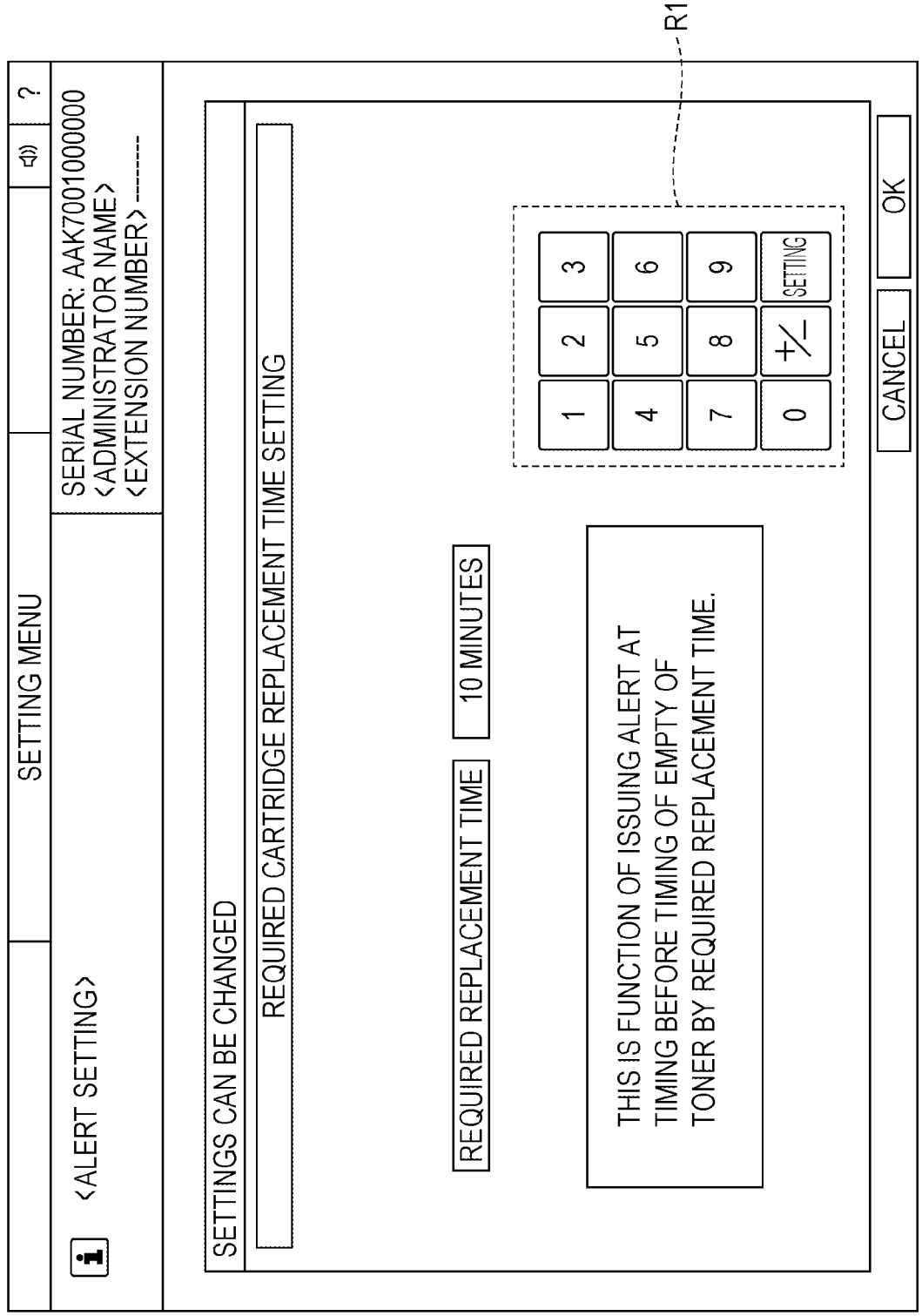
FIG. 5 is a diagram illustrating a required replacement time registration screen displayed on an operation panel according to the first embodiment.

FIG. 5 is a diagram illustrating a required replacement time registration screen displayed on the operation panel 20. On the registration screen illustrated in FIG. 5, the operator can register a desired required replacement time using a numeric keypad R1 displayed on the operation panel 20.

By registration processing of the required replacement time, the operator receives a notification of arrival of replacement time at a timing (hereinafter, referred to as "cartridge replacement timing") before a timing (hereinafter, referred to as "predicted toner runout timing") at which the cartridge 81 reaches a toner runout state by the registered required replacement time (details will be described later in a function of the notifier 105).

Note that, in the present embodiment, as an example of the method of registration of the required replacement time by the required replacement time registerer 102, a mode is described in which the operator performs registration using the operation panel 20 of the image forming apparatus 1, but the method of registration can be variously modified. For example, the required replacement time registerer 102 may register the required replacement time transmitted from an external terminal (for example, the mobile terminal Mo) to the image forming apparatus 1 in the storage unit. In addition, the required replacement time registerer 102 may automatically register the required replacement time instead of the operator's setting registration.

The toner consumption speed calculator 103 calculates a toner consumption speed when an image is printed, on the basis of the data of the image to be printed and a printing speed when the image is printed. For example, the toner consumption speed calculator 103 specifies a coverage (coverage rate) of the image to be printed from the data of the image to be printed, and calculates the amount of toner consumption per unit distance on the basis of the coverage. Then, the toner consumption speed calculator 103 calculates the toner consumption speed when the image is printed, by multiplying the amount of toner consumption per unit distance by the printing speed when the image is printed. At this time, for example, the toner consumption speed calculator 103 calculates the amount of toner consumption per unit distance of each toner color of Y, M, C, and K from the data of the image to be printed, thereby separately calculating the toner consumption speed of each toner color of Y, M, C, and K.

FIG. 6 is a diagram illustrating an example of table data referred to by the toner consumption speed calculator 103 to calculate the toner consumption speed. FIG. 6 is table data indicating a relationship between the coverage of the image to be printed and the amount of toner consumption per unit distance, and the table data of FIG. 6 stores the amount of toner consumption per unit distance when the coverage of the image to be printed is each of 3.5%, 15%, 30%, 50%, and 80% for each toner color of Y, M, C, and K. The amount of toner consumption per unit distance depending on the coverage of the image to be printed is specified in advance by, for example, an experiment or simulation, and is stored in the ROM 100b or the like of the control unit 100.

Note that, since the coverage and the amount of toner consumption of the image are generally in a direct proportional relationship, the amount of toner consumption per unit distance stored in the ROM 100b or the like may be only data when the coverage is a predetermined value (for example, 30%). In this case, it is sufficient that the toner consumption speed calculator 103 calculates the amount of toner consumption per unit distance when the image is printed, on the basis of the coverage of the image to be printed and the amount of toner consumption when the coverage stored in the ROM 100b or the like is a predetermined value.

Here, as the "amount of toner consumption per unit distance" referred to when the toner consumption speed calculator 103 calculates the toner consumption speed, in a case where the image to be printed is a repeated pattern like a label, it is preferable to use the amount of toner consumption per one label to be printed. However, the "amount of toner consumption per unit distance" is not limited thereto, and an amount of toner consumption per meter may be used, or an amount of toner consumption for one general sheet (for example, A4 size) may be used.

Furthermore, the toner consumption speed calculator 103 may calculate the amount of toner consumption per unit distance when the image to be printed is printed, by referring to density information for each color and the like in addition to the coverage information, from the data of the image to be printed.

Note that, a "printing speed in a print job" referred to when the toner consumption speed is calculated by the toner consumption speed calculator 103 may be set by the operator, or may be automatically set on the basis of the data of the image to be printed, a type of the long sheet P, and the like. In general, a material of the long sheet P used in this type of the image forming apparatus 1 varies depending on each manufacturer, and a time required to fix the image also varies depending on the material of the long sheet P. For that reason, in the image forming apparatus 1 according to the present embodiment, the printing speed in the print job is changeable. When the printing speed is changed, a speed of the long sheet P sent from the sheet feeding apparatus 2 is changed, and an amount of the image formed on the long sheet P per unit time is changed, so that naturally, the toner consumption speed is also changed accordingly. From such a viewpoint, the toner consumption speed calculator 103 calculates the toner consumption speed when the image is printed, on the basis of the data of the image to be printed and the printing speed when the image is printed.

The toner runout timing predictor 104 predicts the timing at which the cartridge 81 reaches the toner runout state during execution of the print job on the basis of the remaining amount of toner in the cartridge 81 estimated by the remaining-amount-of-toner estimator 101, and the toner consumption speed in the print job calculated by the toner consumption speed calculator 103. For example, the toner runout timing predictor 104 estimates a time (=remaining amount of toner/toner consumption speed) from the present time until the cartridge 81 reaches the toner runout state, by dividing the remaining amount of toner in the cartridge 81 at the present time by the toner consumption speed in the print job, thereby predicting the timing at which the cartridge 81 reaches the toner runout state.

The notifier 105 sets, as the cartridge replacement timing, a timing (corresponding to a "second timing" of the present invention) before the predicted toner runout timing (corresponding to a "first timing" of the present invention) predicted by the toner runout timing predictor 104 by the required replacement time registered in the required replacement time registerer 102. Then, the notifier 105 makes a notification (hereinafter, referred to as a "cartridge replacement alert") for prompting the operator to replace the cartridge 81 with arrival of the set cartridge replacement timing as a trigger. Note that, the notifier 105 detects the arrival of the cartridge replacement timing by, for example, collating a time indicated by a clocking unit (not illustrated) included in the control unit 100 with a time indicated by the set cartridge replacement timing.

Examples of means by which the notifier 105 issues the cartridge replacement alert include screen display on the operation panel 20, lighting display by the warning lamp Ua, voice guidance from a speaker (not illustrated) of the image forming apparatus 1, alert transmission to the mobile terminal Mo carried by the operator, and the like. The notifier 105 may issue the cartridge replacement alert by selecting only any one means of these, or may issue the cartridge replacement alert by using a plurality of means of these.

However, the notifier 105 preferably uses both an alert (that is, screen display on the operation panel 20, lighting display by the warning lamp Ua, or voice guidance from the speaker) in the image forming apparatus 1 itself and alert transmission to the mobile terminal Mo carried by the operator. As a result, even in a case where the operator is present at a position away from the image forming apparatus 1, it is possible to issue the cartridge replacement alert to the operator. Note that, in a case where the alert transmission is performed from the notifier 105 to the mobile terminal Mo, for example, it is sufficient that pairing is performed between the image forming apparatus 1 and the mobile terminal Mo in advance using wireless communication such as wireless LAN or Bluetooth.

Figure 7:
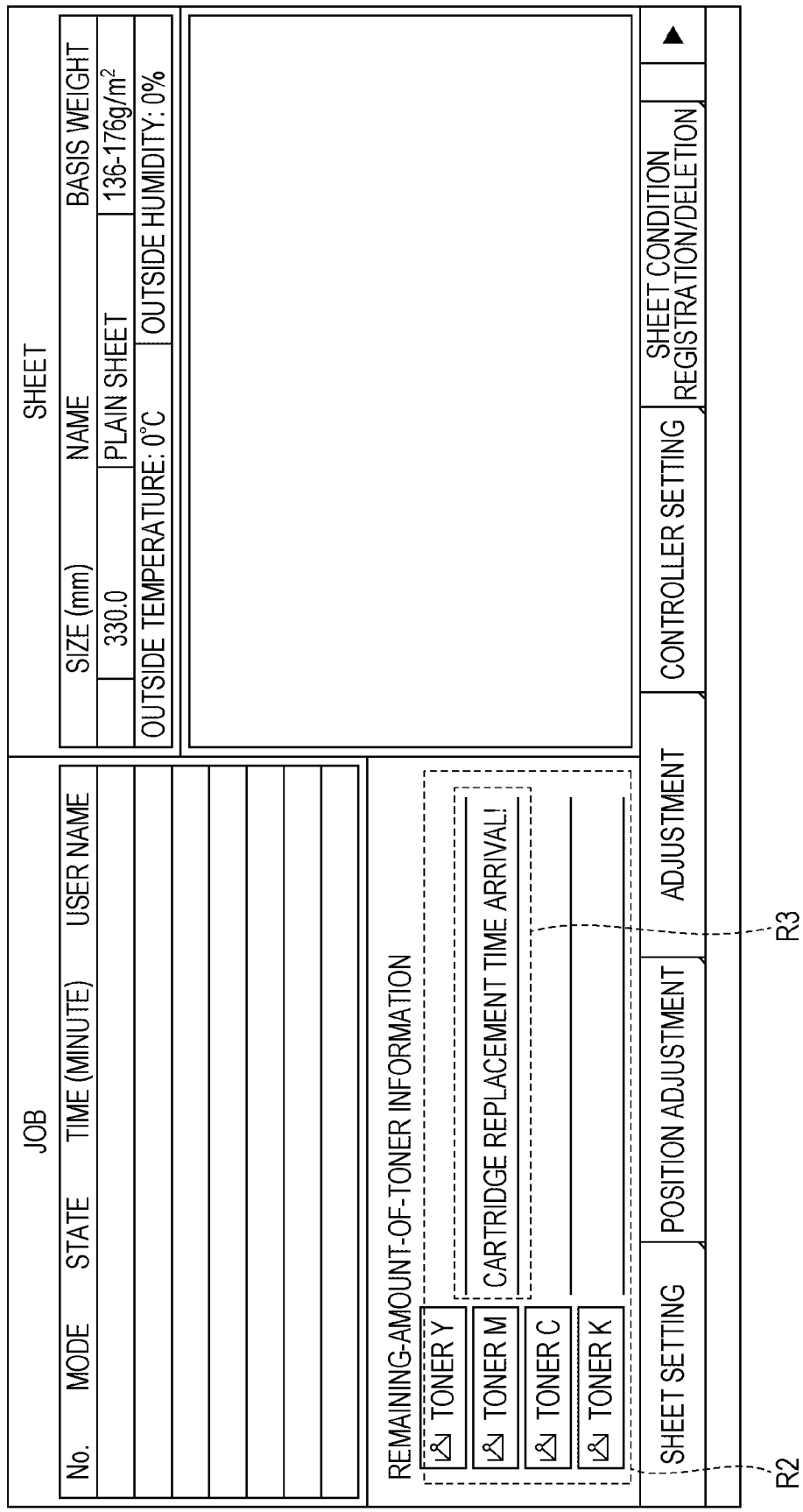
FIG. 7 is a diagram illustrating an example of a cartridge replacement alert by a notifier according to the first embodiment.

FIG. 7 is a diagram illustrating an example of the cartridge replacement alert by the notifier 105. FIG. 7 illustrates a screen of the operation panel 20, and in FIG. 7, a mode is illustrated in which the cartridge replacement alert is issued by screen display on the operation panel 20.

In the present embodiment, remaining-amount-of-toner information R2 of the cartridge 81 of each toner color is always displayed on the screen of the operation panel 20. Then, the notifier 105 displays an image of the cartridge replacement alert in an area (an M color component in FIG. 7) R3 corresponding to the cartridge 81 in which the cartridge replacement timing has arrived, in a display area of the remaining-amount-of-toner information R2, with the arrival of the cartridge replacement timing in the cartridge 81 of any of the Y, M, C, and K toner colors as a trigger.

[Operation Flow of Image Forming Apparatus (Control Unit)]

Figure 8:
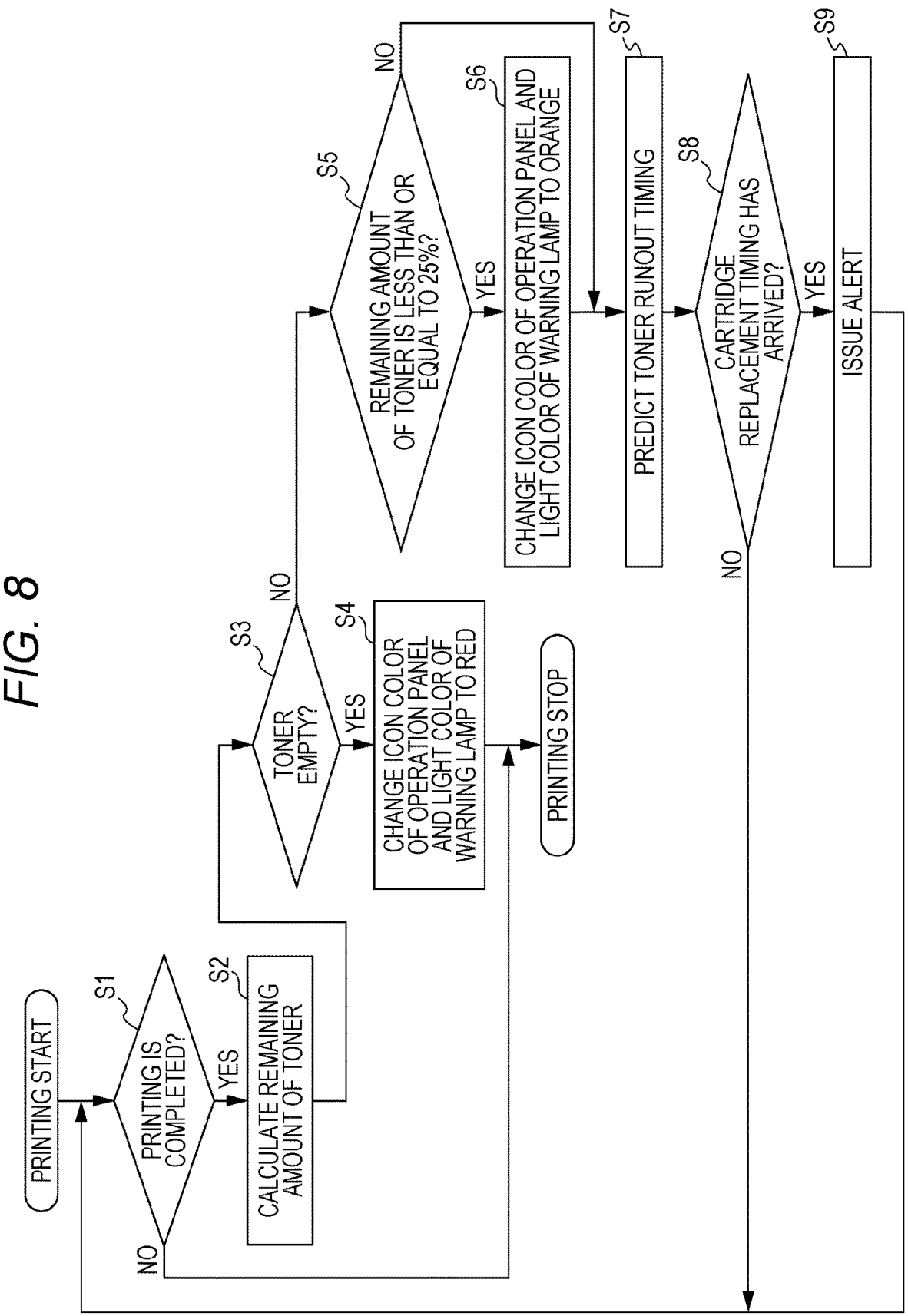
FIG. 8 is a flowchart illustrating an example of operation of the image forming apparatus according to the first embodiment.

FIG. 8 is a flowchart illustrating an example of the operation of the image forming apparatus 1 (control unit 100). The flowchart illustrated in FIG. 8 is, for example, processing sequentially executed by the control unit 100 in accordance with a computer program when printing is executed.

In step S1, the control unit 100 first determines whether or not a print job for which an instruction is given is completed. Here, in a case where the print job for which the instruction is given is completed (S1: YES), the control unit 100 ends the processing of the flowchart of FIG. 8, and in a case where the print job for which the instruction is given is not completed (S1: NO), the control unit 100 advances the processing to step S2.

Note that, the determination processing in step S1 is executed, for example, for each unit distance (for example, a length of one label to be printed) of the long sheet P. In other words, loop processing of the flowchart of FIG. 8 is executed for each unit distance of the long sheet P.

In step S2, the control unit 100 calculates the remaining amount of toner in the cartridge 81 of each toner color of Y, M, C, and K. In step S2, the control unit 100 calculates the remaining amount of toner in the cartridge 81 of each toner color by a function of the remaining-amount-of-toner estimator 101 described above.

In step S3, the control unit 100 determines whether or not the remaining amount of toner in the cartridge 81 of each toner color estimated in step S2 indicates a toner empty state. Here, in a case where the remaining amount of toner in the cartridge 81 of any of the Y, M, C, and K toner colors indicates the toner empty state (S3: YES), the control unit 100 advances the processing to step S4, and in a case where the remaining amounts of toner in the cartridges 81 of all the Y, M, C, and K toner colors do not indicate the toner empty state (S3: NO), the control unit 100 advances the processing to step S5.

In step S4, the control unit 100 changes an icon color of the cartridge 81 that has reached the toner empty state of the operation panel 20 (for example, the icon color of the cartridge image in the display area of the remaining-amount-of-toner information R2 in FIG. 7) to red, and changes a lighting color of the warning lamp Ua to red. Furthermore, in step S4, the remaining amount of toner in the cartridge 81 of any toner color among the Y, M, C, and K toner colors is in the toner empty state, and the image forming apparatus 1 is in a non-printable state, so that the control unit 100 stops printing processing in the image forming apparatus 1.

In step S5, the control unit 100 determines whether or not the remaining amount of toner in the cartridge 81 of each toner color estimated in step S2 is less than or equal to 25%. Here, in a case where the remaining amount of toner in the cartridge 81 of any toner color among the Y, M, C, and K toner colors indicates less than or equal to 25% (S5: YES), the control unit 100 advances the processing to step S6, and in a case where the remaining amounts of toner in the cartridges 81 of all the Y, M, C, and K toner colors do not indicate less than or equal to 25% (S5: NO), the control unit 100 advances the processing to step S7.

In step S6, the control unit 100 changes the icon color of the operation panel 20 (for example, a cartridge 81 image of FIG. 7) to orange, and changes the lighting color of the warning lamp La to orange. Then, after step S6, the control unit 100 advances the processing to step S7.

In step S7, the control unit 100 predicts the toner runout timing on the basis of the remaining amount of toner in the cartridge 81 of each toner color estimated in step S2, and job content of the print job. In step S7, the control unit 100 predicts the toner runout timing of the cartridge 81 of each toner color by functions of the toner consumption speed calculator 103 and the toner runout timing predictor 104.

Note that, in step S7, for example, the control unit 100 calculates the coverage of each toner color from the data of the image to be printed, and reads the printing speed when the image is printed, thereby calculating the toner consumption speed of each toner color when the image is printed. Then, the control unit 100 predicts the toner runout timing of the cartridge 81 of each toner color, by dividing the remaining amount of toner in the cartridge 81 by the toner consumption speed when the image is printed, for each toner color.

In step S8, the control unit 100 sets the cartridge replacement timing and determines arrival of the cartridge replacement timing by the function of the notifier 105 described above. Specifically, the control unit 100 first reads the required replacement time stored in advance in the storage unit (for example, the ROM 100b), and sets a timing before the toner runout timing of the cartridge 81 of each toner color calculated in step S7 by the required replacement time, as the cartridge replacement timing. Then, the control unit 100 refers to the current time and determines whether or not the cartridge replacement timing has arrived. Here, in a case where the cartridge replacement timing has arrived (S8: YES), the control unit 100 advances the processing to step S9, and in a case where the cartridge replacement timing has not arrived (S8: NO), the control unit 100 returns to step S1 and executes similar processing again.

In step S9, the control unit 100 issues a cartridge replacement alert for prompting the operator to replace the cartridge 81. In step S9, the control unit 100 issues the cartridge replacement alert by screen display on the operation panel 20, alert transmission to the mobile terminal Mo carried by the operator, and the like. Then, after step S9, the control unit 100 returns to step S1 and executes similar processing again.

The image forming apparatus 1 (the control unit 100) according to the present embodiment prompts the operator to replace the cartridge 81 at an appropriate timing by such processing, and prevents toner runout of the cartridge 81 from occurring during execution of printing by the image forming apparatus 1.

[Effects]

As described above, the image forming apparatus 1 according to the present embodiment can predict the timing at which the cartridge 81 reaches the toner runout state on the basis of the content of the print job, and can make a notification for prompting the operator to replace the cartridge 81 at the appropriate timing (that is, the timing before the predicted toner runout timing by the required replacement time).

As a result, it is possible to prevent operation stop of the image forming apparatus 1 from being caused.

Furthermore, the operator can grasp the cartridge replacement time at an appropriate timing even at a distant place, and can perform a plurality of tasks without causing occurrence of printing downtime. That is, this makes it possible to suppress a situation in which toner is discarded unnecessarily while improving production efficiency.

(Second Embodiment)

Next, a configuration of an image forming apparatus 1 according to a second embodiment will be described with reference to FIG. 9.

The image forming apparatus 1 according to the present embodiment is different from the image forming apparatus 1 according to the first embodiment in that it is possible to separately register a required replacement time that defines a timing at which a notification for prompting replacement of the cartridge 81 is made to the operation panel 20, and a required replacement time that defines a timing at which a notification for prompting replacement of the cartridge 81 is made to the mobile terminal Mo. Note that, description of configurations common to the first embodiment will be omitted (hereinafter, the same applies to other embodiments).

In a case where the operator of the image forming apparatus 1 performs a plurality of tasks, the operator may be present at a distant place away from a position where the image forming apparatus 1 is installed. In such a case, a time required to replace the cartridge 81 may be longer than that in a case where the operator is present at the position where the image forming apparatus 1 is installed.

From such a viewpoint, in the present embodiment, the required replacement time registerer 102 of the control unit 100 can separately register the required replacement time (hereinafter referred to as "first-type required replacement time") that defines the timing at which the notification for prompting replacement of the cartridge 81 is made to the operation panel 20, and the required replacement time (hereinafter referred to as "second-type required replacement time") that defines the timing at which the notification for prompting replacement of the cartridge 81 is made to the mobile terminal Mo. As a result, for example, the timing of notifying the mobile terminal Mo can be set to be earlier than the timing of notifying the operation panel 20.

Figure 9:
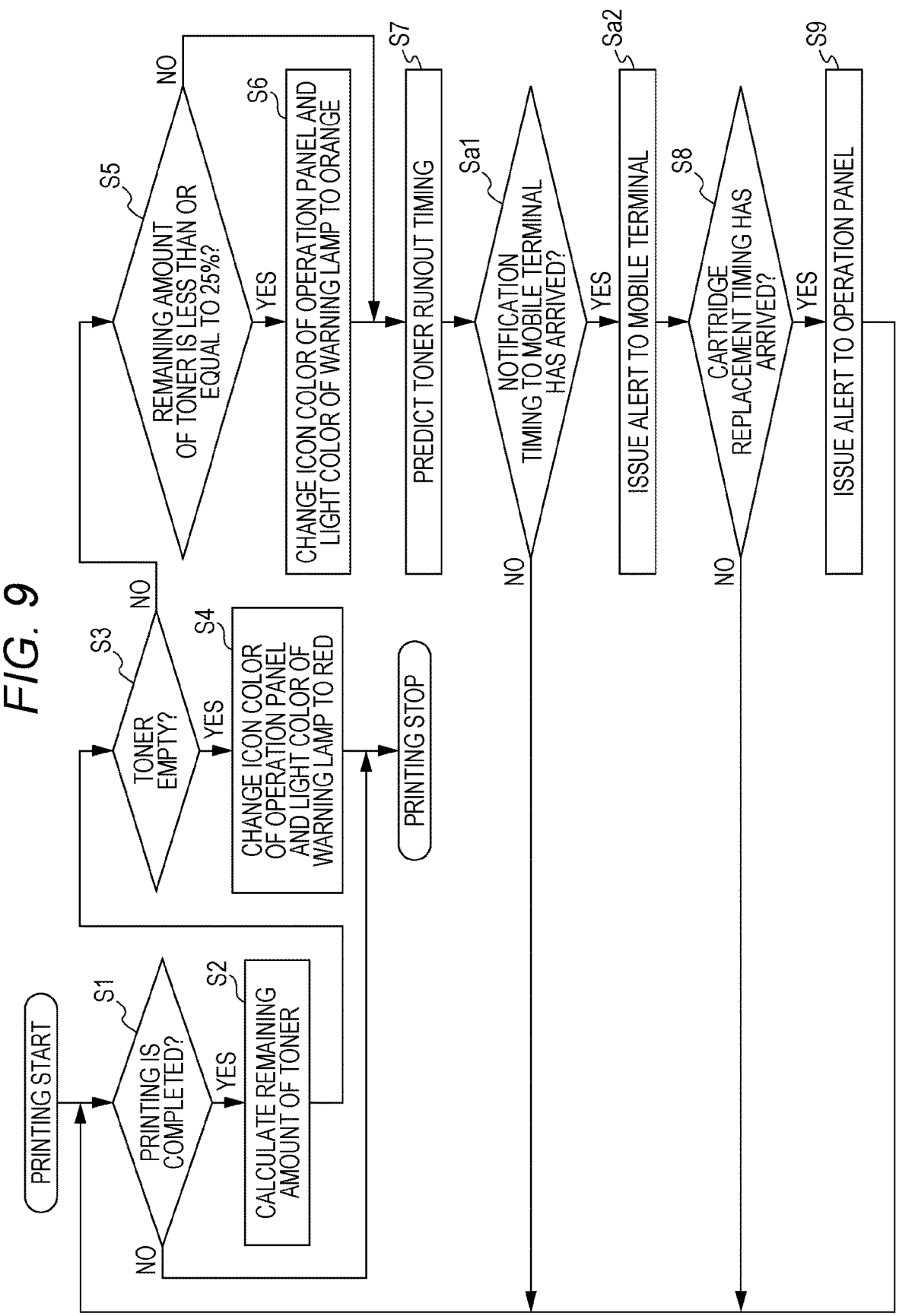
FIG. 9 is a flowchart illustrating an example of operation of an image forming apparatus according to a second embodiment.

FIG. 9 is a flowchart illustrating an example of operation of the image forming apparatus 1 (control unit 100) according to the present embodiment. The flowchart of FIG. 9 is different from the flowchart of FIG. 8 in that processing of steps Sa1 and Sa2 is inserted between steps S7 and S8 of the flowchart of FIG. 8. Note that, the processing of steps S1 to S7 and the processing of steps S8 to S9 in the flowchart of FIG. 9 are the same as the processing of steps S1 to S9 described in FIG. 8, and thus the description thereof will be omitted here.

Steps Sa1 and Sa2 are executed after the processing of predicting the toner runout timing in step S7. Note that, in the flowchart of FIG. 9, it is assumed that the first-type required replacement time and the second-type required replacement time are registered such that the timing at which the notification for prompting replacement of the cartridge 81 is made to the mobile terminal Mo is earlier than the timing at which the notification for prompting replacement of the cartridge 81 is made to the operation panel 20, and the processing of steps Sa1 and Sat is executed before the processing of steps S8 and S9.

In step Sa1, the control unit 100 determines whether or not the notification timing to the mobile terminal Mo has arrived. Specifically, the control unit 100 first reads the second-type required replacement time stored in advance in the storage unit (for example, the ROM 100b), and sets, as the notification timing to the mobile terminal Mo, a timing before the toner runout timing of the cartridge 81 of each toner color calculated in step S7 by the second-type required replacement time. Then, the control unit 100 refers to the current time and determines whether or not the notification timing has arrived. Here, in a case where the notification timing has arrived (Sa1: YES), the control unit 100 advances the processing to step Sa2, and in a case where the notification timing has not arrived (Sa1: NO), the control unit returns to step S1 and executes similar processing again.

In step Sa2, the control unit 100 makes notification for prompting replacement of the cartridge 81 to the mobile terminal Mo via the communication unit 71.

After step Sa2, the control unit 100 advances the processing to step S8, and determines whether or not to notify the operation panel 20 as described with reference to the flowchart of FIG. 8. Note that, in step S8, the control unit 100 reads the first-type required replacement time stored in advance in the storage unit (for example, the ROM 100b), and sets a timing before the toner runout timing of the cartridge 81 of each toner color calculated in step S7 by the first-type required replacement time, as a notification timing to the operation panel 20.

As described above, according to the image forming apparatus 1 of the present embodiment, for example, the timing of making the notification for prompting the replacement of the cartridge 81 to the mobile terminal Mo can be made earlier than the timing of making the notification for prompting the replacement of the cartridge 81 to the operation panel 20 (that is, the display 21) of the image forming apparatus 1. As a result, even in a case where the operator is away from the image forming apparatus 1, it is possible to suppress occurrence of a situation in which the replacement of the cartridge 81 is not in time for the occurrence timing of the toner runout state.

(Third Embodiment)

Next, a configuration of an image forming apparatus 1 according to a third embodiment will be described with reference to FIG. 10.

The image forming apparatus 1 according to the present embodiment is different from the image forming apparatus 1 according to the first embodiment in that the required replacement time can be automatically corrected to a more appropriate time.

Some operators of the image forming apparatus 1 do not know the method of registration of the required replacement time, and the image forming apparatus 1 may be operating with the required replacement time remaining at the initial setting (for example, 10 minutes). In such a case, since a timing of issuing the cartridge replacement alert (notification for prompting replacement of the cartridge 81) does not actually take into consideration of the time required to replace the cartridge 81, there is a possibility that the cartridge replacement alert will prompt replacement of the cartridge 81 at an unnecessarily early timing or, conversely, will be a timing not in time for actual replacement of the cartridge 81.

From such a viewpoint, the required replacement time registerer 102 of the control unit 100 according to the present embodiment specifies a timing at which the cartridge 81 is actually replaced by the operator, and automatically corrects the required replacement time to a more appropriate time from the timing. Note that, the required replacement time registerer 102 specifies the timing at which the cartridge 81 is actually replaced by the operator, for example, using a sensor signal acquired from a cartridge sensor (not illustrated) that detects an insertion/removal state of the cartridge 81 arranged in the toner replenishing unit 80.

For example, in a case where the cartridge 81 is replaced after the timing at which the toner runout of the cartridge 81 occurs, the required replacement time registerer 102 according to the present embodiment automatically corrects the required replacement time to a longer side by one step (for example, 1 minute). As a result, the required replacement time registerer 102 automatically corrects the required replacement time to a more appropriate time interval not to cause a replacement delay of the cartridge 81.

Note that, toner runout of the cartridge 81 is detected on the basis of a sensor signal of the remaining-amount-of-toner sensor that detects the remaining amount of toner of the cartridge 81 arranged in the toner replenishing unit 80, a sensor signal of a sensor that detects a state of a developer of each toner color component adhering to the photoreceptor drum 413, or a sensor signal from an image reading device that reads an image formed on the long sheet P (none of them are illustrated), or the like.

Furthermore, as a response to a case where the required replacement time is set to be excessively long, in a case where the timing at which the cartridge 81 is replaced is a timing before the toner runout timing predicted by the toner runout timing predictor 104 by a threshold time or more, for example, the required replacement time registerer 102 according to the present embodiment may perform processing of automatically correcting the required replacement time to a shorter time by one step (for example, 1 minute).

Note that, the method of correcting the required replacement time by the required replacement time registerer 102 is not limited to the above. For example, the required replacement time registerer 102 may automatically determine an appropriate required replacement time from a difference between the timing at which the cartridge 81 is actually replaced and the predicted toner runout timing.

Figure 10:
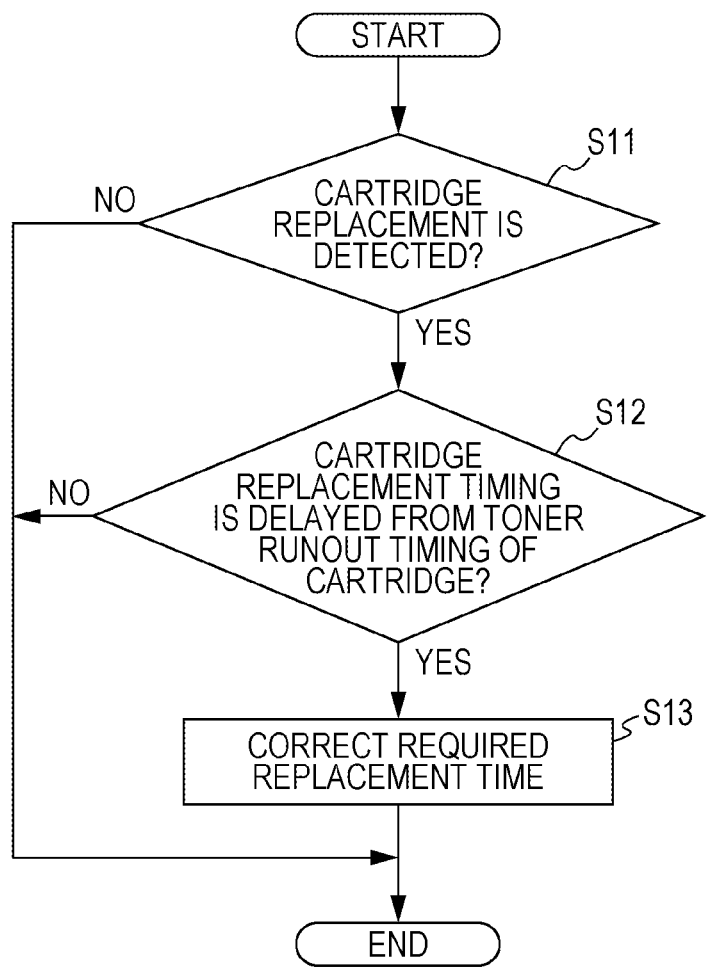
FIG. 10 is a flowchart illustrating an example of operation of an image forming apparatus according to a third embodiment.

FIG. 10 is a flowchart illustrating an example of operation of the image forming apparatus 1 (control unit 100) according to the present embodiment. The flowchart illustrated in FIG. 10 is, for example, processing sequentially executed by the control unit 100 in accordance with a computer program at predetermined time intervals when the image forming apparatus 1 is in operation.

In step S11, the control unit 100 acquires a sensor signal from the cartridge sensor arranged in the toner replenishing unit 80, and determines whether or not the cartridge 81 is replaced. Here, in a case where the cartridge 81 is replaced (S11: YES), the control unit 100 advances the processing to step S12, and in a case where the cartridge 81 is not replaced (S11: NO), the control unit 100 ends the processing of the flowchart of FIG. 10 without executing any particular processing.

In step S12, the control unit 100 determines whether or not the replacement timing of the cartridge 81 is delayed from the toner runout timing of the cartridge 81. Here, in a case where the replacement timing of the cartridge 81 is delayed from the toner runout timing of the cartridge 81 (S12: YES), the control unit 100 advances the processing to step S13, and in a case where the replacement timing of the cartridge 81 is not delayed from the toner runout timing of the cartridge 81 (S12: NO), the control unit 100 ends the processing of the flowchart of FIG. 10 without executing any particular processing.

In step S13, the control unit 100 corrects the currently registered required replacement time to one step longer (for example, 1 minute), and ends the processing of the flowchart of FIG. 10.

As described above, according to the image forming apparatus 1 of the present embodiment, the timing of issuing the cartridge replacement alert can be automatically adjusted to an appropriate time.

According to the image forming apparatus of the present disclosure, it is possible to prevent the operator from missing the cartridge replacement time.

Although embodiments of the present invention have been described and illustrated in detail, the disclosed embodiments are made for purposes of illustration and example only and not limitation. The technology described in the claims includes various modifications and changes of the specific examples exemplified above. The scope of the present invention should be interpreted by terms of the appended claims.

What is claimed is:

1. An image forming apparatus comprising:
a hardware processor that:
estimates a remaining amount of toner in a cartridge;
registers a required replacement time corresponding to a time required by an operator to replace the cartridge;
calculates a toner consumption speed when an image is printed, on the basis of data of the image to be printed and a printing speed when the image is printed;
predicts a first timing at which the cartridge reaches a toner runout state during printing of the image, on the basis of the remaining amount of toner and the toner consumption speed;
makes notification for prompting the operator to replace the cartridge at a second timing before the first timing by the required replacement time; and
corrects the required replacement time on the basis of a third timing at which the cartridge is actually replaced by the operator while the image forming apparatus is in operation, wherein the third timing is delayed from a timing at which the cartridge reaches a toner runout state.

2. The image forming apparatus according to claim 1, wherein the hardware processor makes the notification to a display of the image forming apparatus.

3. The image forming apparatus according to claim 1, wherein the hardware processor makes the notification to a mobile terminal carried by the operator.

4. The image forming apparatus according to claim 3, wherein the hardware processor separately registers the required replacement time that defines a timing at which the notification is made to the display, and the required replacement time that defines a timing at which the notification is made to the mobile terminal.

5. The image forming apparatus according to claim 1, wherein the image forming apparatus is applied to printing on a long sheet.

6. A method for controlling an image forming apparatus, the method comprising:
estimating a remaining amount of toner in a cartridge;
registering a required replacement time corresponding to a time required by an operator to replace the cartridge;
calculating toner consumption speed when an image is printed, on the basis of data of the image to be printed and a printing speed when the image is printed;
predicting a first timing at which the cartridge reaches a toner runout state during printing of the image, on the basis of the remaining amount of toner and the toner consumption speed;
making notification for prompting the operator to replace the cartridge at a second timing before the first timing by the required replacement time; and
correcting the required replacement time on the basis of a third timing at which the cartridge is actually replaced by the operator while the image forming apparatus is in operation, wherein the third timing is delayed from a timing at which the cartridge reaches a toner runout state.

* * * * *